United States Patent
Kelappan et al.

(10) Patent No.: US 9,383,889 B2
(45) Date of Patent: Jul. 5, 2016

(54) PROCESS FLOW DESIGNING BASED ON CONNECTION COMPATIBILITY BETWEEN PROCESS COMPONENTS

(75) Inventors: Rakesh Kelappan, Kalpetta (IN); Anil Babu Ankisettipalli, Bangalore (IN); John Macregor, Ascot (GB); Sambit Panda, Bangalore (IN); Sujit Ramesh A, Bangalore (IN)

(73) Assignee: Business Objects Software Limited, Dublin (IE)

( * ) Notice: Subject to any disclaimer, the term of this patent is extended or adjusted under 35 U.S.C. 154(b) by 792 days.

(21) Appl. No.: 13/330,685

(22) Filed: Dec. 20, 2011

(65) Prior Publication Data
US 2013/0159904 A1     Jun. 20, 2013

(51) Int. Cl.
G06F 3/048      (2013.01)
G06F 17/00      (2006.01)
G06F 3/0481     (2013.01)

(52) U.S. Cl.
CPC .................................. G06F 3/0481 (2013.01)

(58) Field of Classification Search
CPC .................................................... G06F 3/0481
USPC ......................................................... 715/769
See application file for complete search history.

(56) References Cited

U.S. PATENT DOCUMENTS

| | | | | |
|---|---|---|---|---|
| 6,738,964 B1 * | 5/2004 | Zink | ................... | G06F 17/5045 715/763 |
| 7,120,896 B2 * | 10/2006 | Budhiraja | ................ | G06F 8/20 715/763 |
| 2003/0084127 A1 * | 5/2003 | Budhiraja | ................ | G06F 8/20 709/220 |

OTHER PUBLICATIONS

Scott Helmers, "Microsoft Visio 2010 Step by Step," Microsoft Press, Apr. 2011, 46 pages.*

* cited by examiner

*Primary Examiner* — Matt Kim
*Assistant Examiner* — Mahelet Shiberou (57) ABSTRACT

In one embodiment, a selection of a process component associated with a process flow is received. Further, a check is made to determine whether a graphical editor includes process components associated with the process flow. If the graphical editor does not include process components, the selected process component is placed on the graphical editor. If the graphical editor includes the process components, then compatibility of the selected process component with at least one of the one or more process components is determined by identifying cardinality and type of the process component. Further, the selected process component is connected to the process flow on the graphical editor based on the determined compatibility.

16 Claims, 11 Drawing Sheets

PROCESS FLOW DESIGNING BASED ON CONNECTION COMPATIBILITY BETWEEN PROCESS COMPONENTS

FIELD

Embodiments generally relate to process flow designing and more particularly to methods and systems to design a process flow based on connection compatibility between process components.

BACKGROUND

Enterprises often use different business applications built over time for analyzing business data. Such business applications may use data mining techniques including execution of a sequence of steps. The sequence of steps is referred to as a process flow associated with the business application. The sequence of steps may include reading data from multiple sources, followed by data preparation step including activities like applying filters or merging data from two different sources. Further, the sequence of steps may include an algorithm step followed by the data preparation step to process the prepared data. Furthermore, a user can visualize and analyze the output data by executing the process flow.

Typically, these steps in the process flow are performed using process components. For example, data source components retrieves the data from data sources, data preparation components performs merging activities, algorithm components process the data, data writer components store the processed data, and the like. Therefore, the process flow includes a chain of process components. This is sometimes called a pipe and filter architecture where the components are filters and the connections between are pipes. Further, each process component may include a standard cardinality, that is, a standard number of input and output ports. For example, a data source component may not include an input port as the data source component is a data reader. Also, a data preparation component may need at least two data source components as the input.

Hence, during designing of the process flow or in other words during construction of the process components chain, a user needs to connect the process components in a proper sequence. Currently, process components are connected manually by the user connecting the process component. Therefore, manually connecting the process components may be prone to errors, time consuming and also the user has to understand the cardinality of the process components. Therefore, a method to connect the process components by automatically detecting the connection compatibility between the process components would be desirable.

SUMMARY

Various embodiments of systems and methods to design a process flow based on connection compatibility between process components are described herein. In one aspect, a selection of a process component associated with a process flow is received. Further, a check is made to determine whether a graphical editor includes process components associated with the process flow. If the graphical editor does not include process components, the selected process component is placed on the graphical editor. In another aspect, if the graphical editor includes the process components, then compatibility of the selected process component with at least one of the one or more process components is determined by identifying cardinality and type of the process component. Further, the selected process component is connected to the process flow on the graphical editor based on the determined compatibility.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques to design a process flow based on connection compatibility between process components are described herein. The process flow includes a set of process steps and an order of performing the process steps to produce a desired result. The process steps are performed using process components. Thereby, the process flow includes a chain of process components. In other words, the chain of process components defines the process components involved for predictive analysis and the data flow in the process components. In one embodiment, the chain of process components is designed on a graphical editor. The graphical editor may include a canvas on a computer generated user interface, where a user designs the process flow. The computer may be desktop computers, work stations, laptop computers, hand held computers, smart phone, console devices or the like. The user refers to an agent, a human or a process flow designer capable of providing input to the computer system for designing the process flow.

According to one embodiment, the connection compatibility between the process components is determined. When a user selects a process component to connect to the process flow, the mutual connection compatibility of the process component and the existing process components on the graphical editor is determined. The compatibility is determined by cardinality and type of the process components. Further, the process component is connected to the process flow depending on the determined compatibility. Since the cardinality is determined automatically without user intervention, designing of the process flow becomes faster and easier. Further, the user need not have knowledge of cardinality of the process components.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
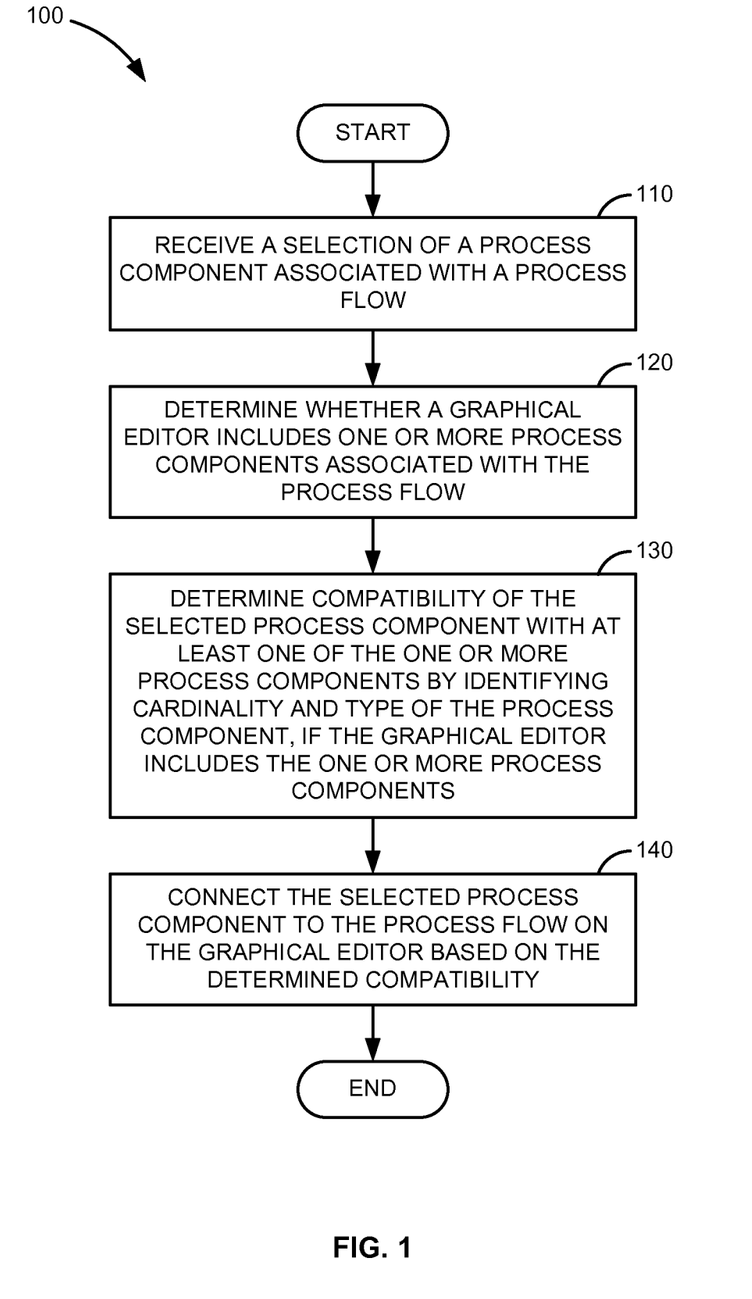
FIG. 1 is a flow diagram illustrating a method of designing a process flow based on connection compatibility between process components, according to an embodiment.

FIG. 1 is a flow diagram 100 illustrating a method of designing a process flow based on connection compatibility between process components, according to an embodiment. At step 110, a selection of a process component associated with a process flow of a business application is received. The process components may include data source components (e.g., database reader components such as table readers, Comma-Separated Values (CSV) reader, XML parser, file reader and the like), pre-processing components (e.g., merger components), algorithm components (e.g., process component to perform clustering or grouping of data using a data mining algorithm such as standard K-Means data mining algorithm), data visualization components and the like. In one exemplary embodiment, the selection of the process component may include at least one of double clicking the process component, and dragging and dropping the process component.

At step 120, a check is made to determine whether a graphical editor includes one or more process components associated with the process flow. In one embodiment, if the graphical editor does not include the process components, the selected process component is placed on the graphical editor. For example, the process component is placed at the center of the graphical editor. Placing the process component on the graphical editor is described with an example in FIG. 4A.

At step 130, if the graphical editor includes the one or more process components, compatibility of the selected process component with at least one of the one or more process components in the graphical editor is determined. The at least one of the process components may include a preferred process component. The at least one of the process components is considered as the preferred process component depending on the type of selection used to select the process component. For example, if the process component is selected by dragging and dropping, the at least one of the process components on the graphical editor is considered as the preferred process component based on the distance between the dragged process component and the at least one of the process component on the graphical editor. In other words, the process component on the graphical editor is considered as the preferred process component if the dragged process component is dragged near to the process component on the graphical editor or within a vicinity of the process component on the graphical editor (described with an example in FIGS. 4B and 4C).

Further, if the process component is selected by highlighting the process component to insert onto the graphical editor (e.g., using inserting mechanism such as 'enter', 'click', and the like), a check is made to determine if the graphical editor includes the preferred process component. In one exemplary embodiment, an option is provided to a user to select a process component in the graphical editor as preferred process component. If the graphical editor does not include the preferred process component, a previous process component connected to the process flow is considered as the preferred process component (explained with an example in FIGS. 4B and 4C).

In one embodiment, the compatibility between the selected process component and the preferred process component is determined by identifying cardinality and type of the selected process component. The cardinality defines number of input ports and number of output ports of the process component. The input ports indicate the minimum and maximum number of possible input connections to the process component. Output ports indicate the minimum and maximum possible output connections from the process component. The cardinality and type of the process components is depicted in Table 1.

TABLE 1

| Process Component | Type of Process Component | No. of Input Ports | No. of Output Ports |
| --- | --- | --- | --- |
| CSV Reader | Data Source Component | Min: 0; Max: 0 | Min: 1; Max: n |
| Merge Component | Data Preparation Component | Min: 2; Max: 2 | Min: 1; Max: n |
| K-Means Component | Algorithm Component | Min: 1; Max: 1 | Min: 1; Max: n |
| JDBC Writer | Writer Component | Min: 1; Max: n | Min: 0; Max: 0 |

For example, the data source component (e.g., CSV reader) may be the starting process component of the process flow as the CSV reader does not have an input port to take input from other process components. Similarly, writer components (e.g., Java Database Connectivity (JDBC writer) may be at the end of the process flow as the JDBC writer does not have an output port to connect to the other process components. Further, the data preparation component (e.g., merge component) expects two input connections to form a valid process flow. In other words, the process flow may be considered as a tree with multiple nodes. The nodes may include a plurality of parent nodes, child nodes and leaf nodes, where the parent node is the first process component in the process flow. In this scenario, the data source component may be the parent node, the data preparation component may be the child node and the writer component may be the leaf node (e.g., the last process component in the process flow).

At step 140, the selected process component is connected to the process flow on the graphical editor based on the determined compatibility. For example, considering preferred process component as the CSV Reader and the selected process component as Merger Component, the Merge Component gets connected to the CSV Reader as CSV Reader has 'n' output ports and Merge Component has two input ports. In another example, if the JDBC Writer is the preferred process component and K-Means Component is the selected process component, the K-Means Component does not get connected to the JDBC Writer as the JDBC Writer does not have output port. Instead, the K-Means Component is placed on the graphical editor without getting connected to the existing process chain. The method of designing process flow is described with an example in FIGS. 4A to 4E.

Figure 2:
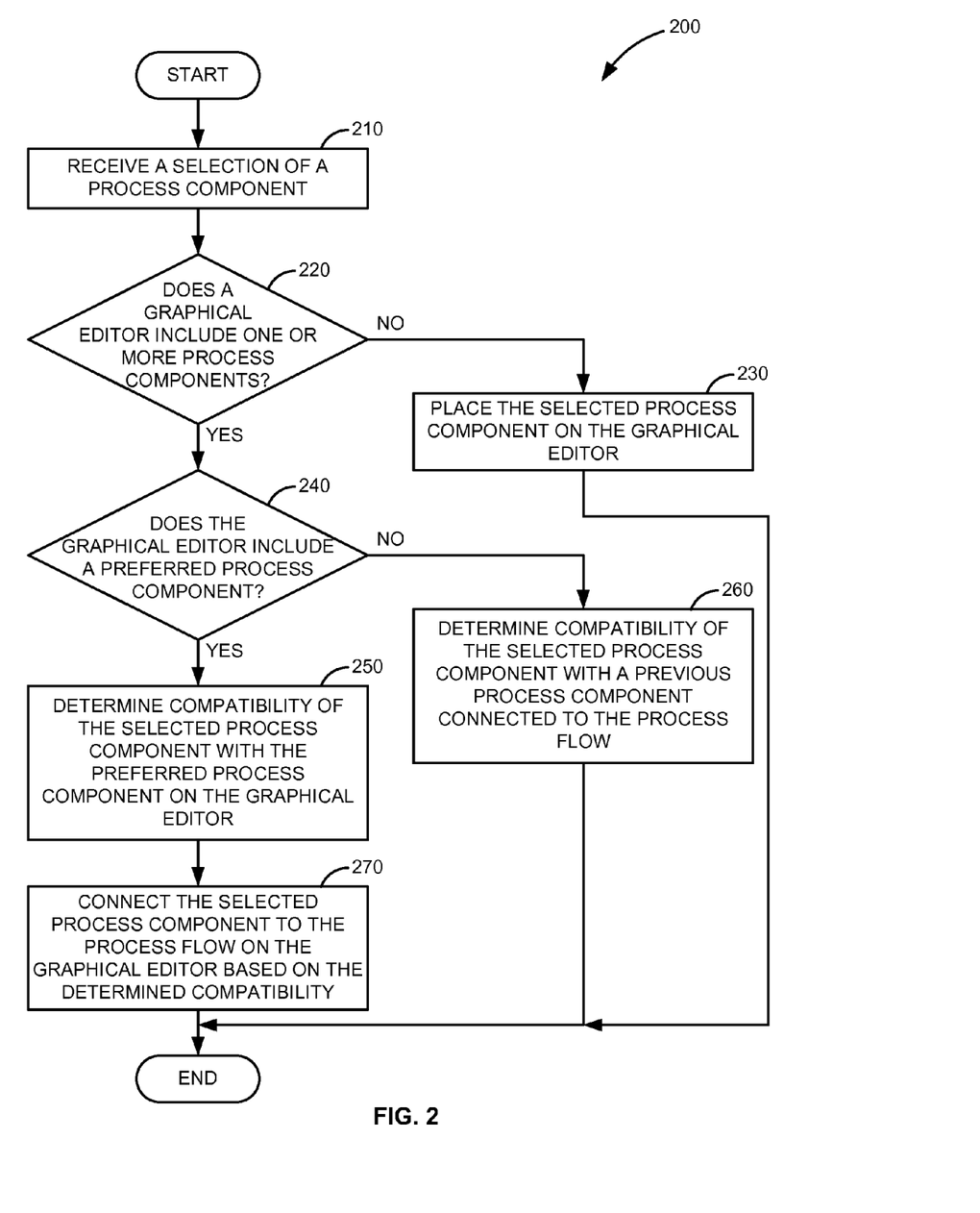
FIG. 2 is a flow diagram illustrating an exemplary method of designing a process flow, according to an embodiment.

FIG. 2 is a flow diagram 200 illustrating an exemplary method of designing a process flow by selecting process components. At step 210, a selection of a process component is received. For example, the process component is selected via highlighting the process component by clicking the process component or entering the process component and the like. The received process component may be a source component (e.g., database reader components such as CSV reader, table readers, file reader and the like), a pre-processing component (e.g., merger components), an algorithm component or a data visualization component associated with the process flow.

At step 220, a check is made to determine whether a graphical editor includes one or more process components. If the graphical editor does not include process components, the selected process component is placed on the graphical editor as in step 230 (described with an example in FIG. 4A).

At step 240, a check is made to determine whether the graphical editor includes a preferred process component. In one exemplary embodiment, a user can select a process component on the graphical editor as the preferred process component. For example, considering a CSV reader component and a K-Means component are present in the graphical editor, the user may select one of the CSV reader component or the K-Means component as the preferred process component.

At step 250, if the graphical editor includes the preferred process component, compatibility of the selected process component with the preferred process component is determined. For example, if the K-Means component on the graphical editor is the preferred process component and a JDBC writer component is the selected process component, the compatibility between the K-Means component and the JDBC writer component is determined. The compatibility is determined by identifying the cardinality and the type of the JDBC writer component and the K-Means component. The JDBC writer component is a data writer component including multiple input ports and no output port. Further, K-Means component may include multiple output ports. Therefore, the connection of the K-Means component and the JDBC component may be connected.

At step 260, if the graphical editor does not include the preferred process component, compatibility of the selected process component with a previous process component is determined. In other words, if the user does not select the preferred process component, the previous process component is considered as the preferred process component. For example, consider the K-Means component as the selected process component. The CSV reader component, the table reader component and the Merge component are present on the graphical editor, the Merge component is considered as the preferred process component as the Merge component is connected lastly to the process flow on the graphical editor. Further, the compatibility between the Merge component and the K-Means component is determined. The compatibility is determined by identifying the cardinality and the type of the Merge component. The Merge component, being the data preparation component, includes two input ports and multiple output ports. Further, K-Means component, being the algorithm component, may include single input port and multiple output ports. Therefore, the Merge component and the K-Means component are compatible.

In another example, consider the CSV reader component on the graphical editor as the preferred process component and the JDBC reader component as the selected process component. The compatibility of the CSV reader component and the JDBC reader component is determined. Since both the JDBC reader and the CSV reader are data source components having no input ports, the CSV reader component may not be compatible with the table reader component.

At step 260, the selected process component is connected to the process flow in the graphical editor based on the determined compatibility. For example, the JDBC writer component gets connected to the K-Means component as per one example in step 250. The K-Means component gets connected to the Merge component as per one example in step 260. The table reader component does not get connected to the CSV reader component, instead the JDBC reader component is placed on the graphical editor creating a new parent node of the process flow (described with an example in FIG. 4B). In general, the process components get connected to the process flow on double clicking the process components and therefore the process components associated with the process flow can be connected without having knowledge about the cardinality of the process components.

Figure 3:
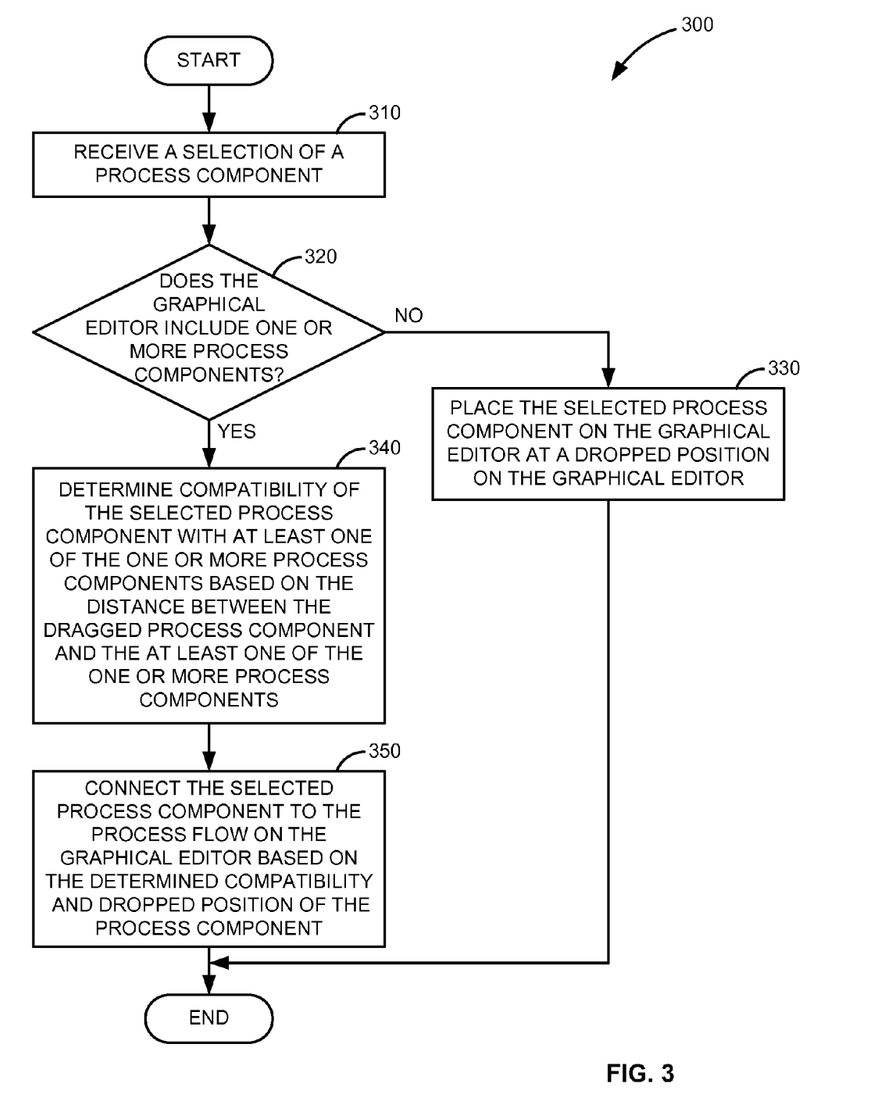
FIG. 3 is a flow diagram illustrating another exemplary method of designing a process flow, according to an embodiment.

FIG. 3 is a flow diagram 300 illustrating another method of designing a process flow, according to an embodiment. At step 310, a selection of a process component is received. For example, the process component is selected via dragging and dropping the process component on a graphical editor on which the process flow is designed. The received process component may be a source component (e.g., database reader components such as CSV reader, table readers, file reader and the like), a pre-processing component (e.g., merger components), an algorithm component or a data visualization component.

At step 320, a check is made to determine whether the graphical editor includes one or more process components. At step 330, the selected process component is placed on the graphical editor at the dropped position on the graphical editor, if the graphical editor does not include process components.

At step 340, if the graphical editor includes the process components, compatibility of the process component with at least one of the one or more process components is determined. The at least one of the process component is the preferred process component. The process component on the graphical editor is considered as the preferred process component based on the distance between the dragged process component and the process components on the graphical editor. In other words, if the process component is dragged closer or within a predetermined vicinity of the process component on the graphical editor, the process component on the graphical editor is considered as the preferred process component. In one exemplary embodiment, if there are multiple process components on the graphical editor having equal distance with the dragged process component, then the compatibility is determined with the most compatible process component depending on the type and the cardinality of the process components.

At step 350, the selected process component is connected to the process flow in the graphical editor based on the determined compatibility. Therefore, the user can design the process flow by dragging and dropping the process components on the graphical editor without having knowledge of cardinality of the process components. The designing of the process flow by selecting the process component via dragging and dropping the process component is described with an example in FIG. 4C.

In one exemplary embodiment, if the user drags and drops a process component between the connected two process components on the graphical editor, the compatibility between the two process components with the dropped process component is determined. If the process components are compatible with one another, the dropped process component gets connected with the two process components on the graphical editor. On other hand, if the process components are not compatible with one another, then the dropped process component is retracted from the process flow and a transient message will be displayed to the user showing the reason of retraction (described with an example in FIG. 4E).

In another exemplary embodiment, if the process component is already connected to another process component in the graphical editor, the user can force connection by dragging a new process component closer to the process component on the graphical editor (e.g., may be 30 pixels closer). On forcing, the connection of the process components in the graphical editor can be deleted and the new process component will get connected to the process component in the graphical editor depending on the compatibility between the new process component and the process component on the graphical editor. If the new process component and the process component on the graphical editor are not compatible, the new process component may be repelled from the process component on the graphical editor.

In yet another exemplary embodiment, during the drag operation, if the process component is dragged nearer to any compatible process component in the graphical editor, a dummy connection appears from the process component indicating a connection proposal with the process component on the graphical editor at which the process component is dragged. In one embodiment, the cardinality and type of the process component is evaluated before showing the proposal. Further, if the user is satisfied with the proposed connection, the user can drop the process component. On dropping, the new connection will be placed in the graphical editor and the connection proposals will be changed to actual connections between the process components.

In another exemplary embodiment, the user can snap connection of the process components in the graphical editor. The connection line between the process components on the graphical editor is dragged out at certain speed to snap the connection between the process components. Further, the user may be notified of the connection snap using a bubble message stating that the connection with a specific process component has been snapped.

FIGS. 4A to 4E show exemplary user interfaces to design a process flow, according to an embodiment. User interface 400 includes a process component panel 405 to display process components and a graphical editor 410 for designing the process flow. The process components panel 405 may include available process components to design the process flow such as data source components (e.g., CSV reader and JDBC reader), data preparation components (e.g., data merger), algorithm components (R-K-Means and INDB-K-Means), data writer components (e.g., JDBC writer), data visualization components, and the like. The graphical editor 410 includes a canvas 415 for designing the process flow associated with a business application. In one exemplary embodiment, the user interface 400 may include a menu to select an option to design process flow (e.g., process designer 420) and an option to analyze the process flow (e.g., analyzer 425). For example, the business application can be processing data of two data source components by an algorithm and writing the process data into a writer component. FIGS. 4A to 4E illustrate step by step process of designing the process flow of the business application.

Figure 4A:
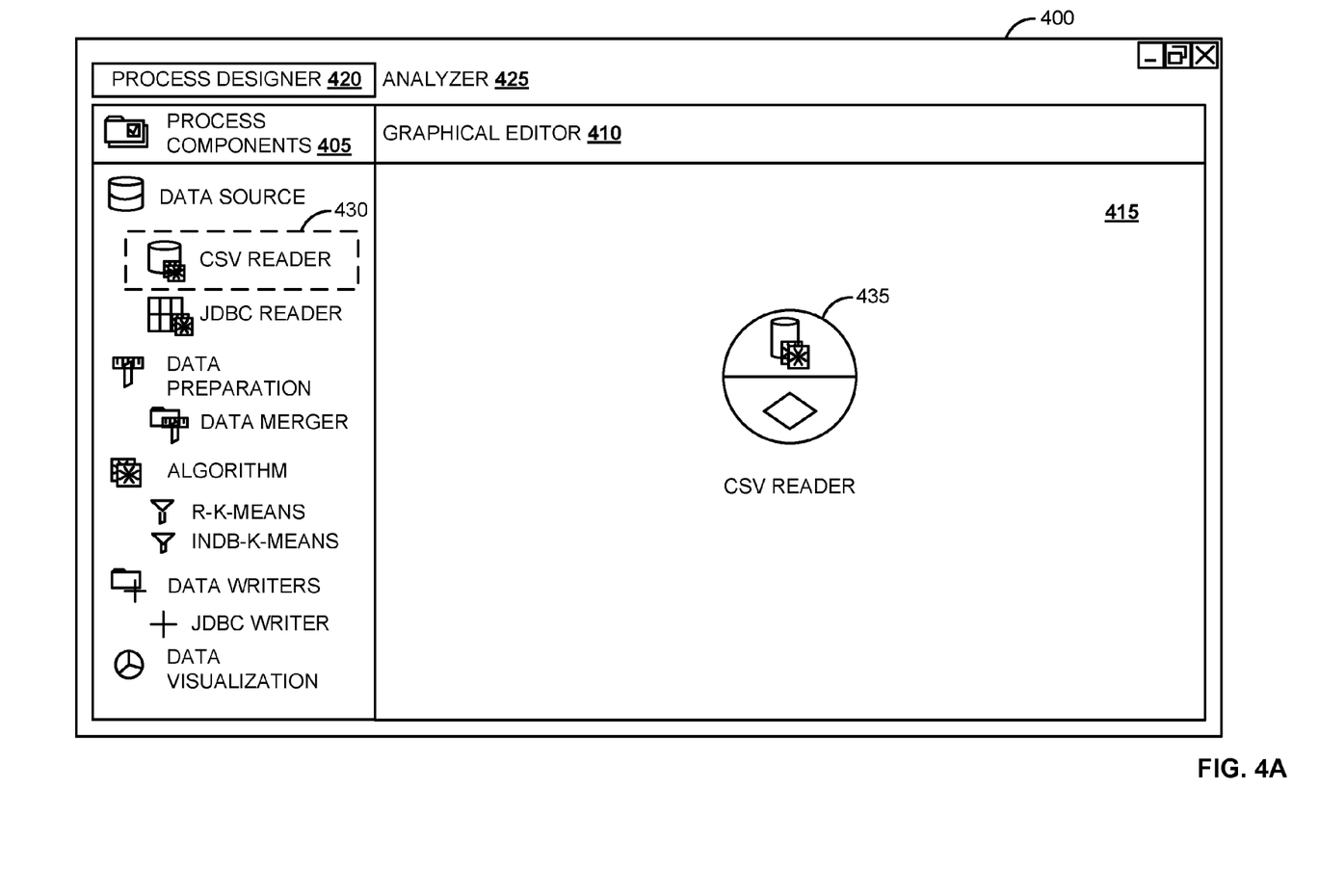
FIGS. 4A to 4E show exemplary user interfaces to design a process flow, according to an embodiment.

FIG. 4A shows the exemplary user interface 400 illustrating a first step of the designing of the process flow of the business application, according to an embodiment. The canvas 415 includes free space without prior presence of the process components. At a first step, a selection of the CSV reader is received. For example, the CSV reader is selected via highlighting the CSV reader as shown in 430. Further, a check is made to determine whether the canvas 415 of the graphical editor 410 includes process components. Since, the canvas 415 does not include process components, the CSV reader is placed on the canvas as shown in 435.

Figure 4B:
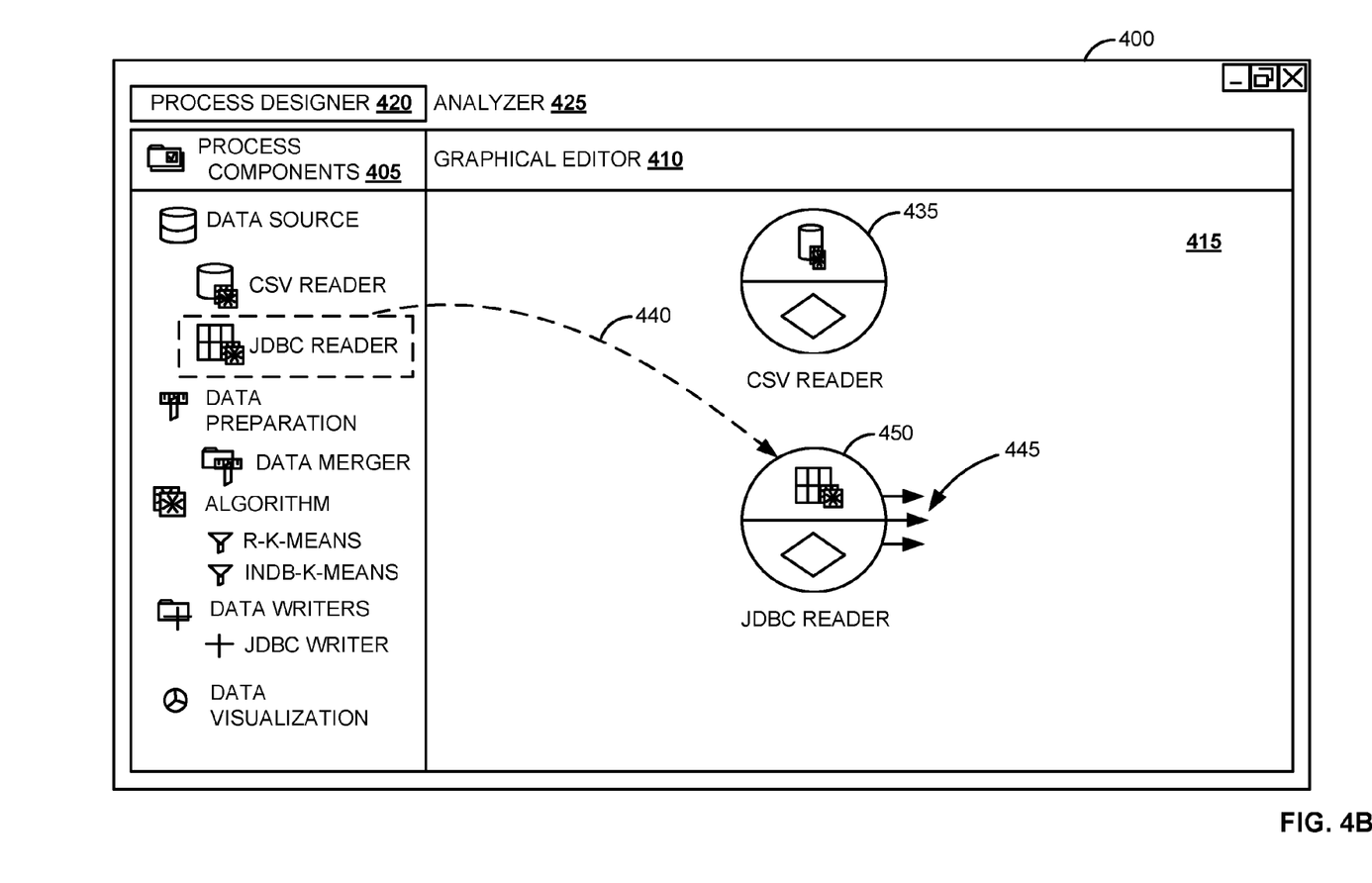

FIG. 4B shows the exemplary user interface 400 illustrating a next step of the designing of the process flow of the business application, according to an embodiment. A selection of the JDBC reader is received. For example, the JDBC reader is selected via dragging and dropping the JDBC reader as shown in 440. Further, a check is made to determine whether the canvas 415 includes process components. In this example, the canvas 415 includes the CSV reader 435 associated with the process flow.

At the next step, a preferred process component on the canvas 415 is identified. In one embodiment, the process component on the canvas is considered as the preferred process component based on the distance between the dragged process component and the process components on the canvas 415. In this example, when the JDBC reader is dragged towards the CSV reader, the CSV reader is considered as the preferred process component. Therefore, the compatibility between the JDBC reader and the CSV reader is determined. In other words, when the JDBC reader is dragged within a vicinity of the CSV reader, the cardinality of the JDBC reader is displayed. For example, an arrow 445 is displayed showing that the JDBC reader may have output port. Further, there is no representation of the input port of the JDBC reader as the JDBC reader does not include any input port. Furthermore, both the CSV reader and the JDBC reader are of same type of the process component (e.g., data source components) and the JDBC reader does not include input ports, the CSV reader and the JDBC reader may not be connected. In this scenario, the JDBC reader is placed on the canvas 415 at the dropped position as shown in 450 forming another parent node in the process flow.

Figure 4C:
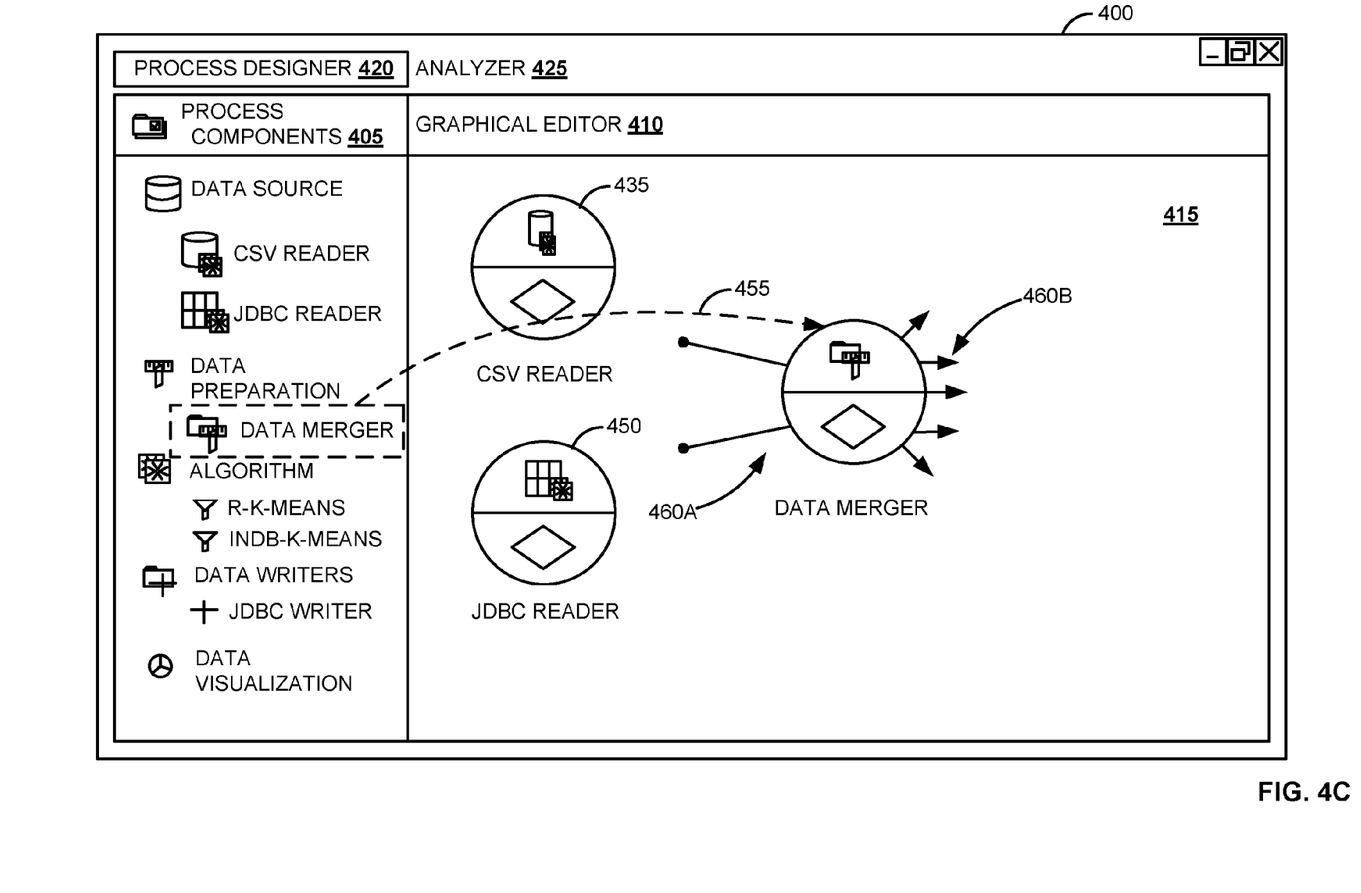

FIG. 4C shows the exemplary user interface 400 illustrating a further step of the designing of the process flow of the business application, according to an embodiment. A selection of the data preparation component (e.g., data merger) is received. For example, the data merger is selected via dragging and dropping the data merger as shown in 455. Further, a check is made to determine whether the canvas 415 includes process components. In this example, the canvas 415 includes the CSV reader 435 and the JDBC reader 450 associated with the process flow.

At next step, a preferred process component on the canvas 415 is identified. In one embodiment, the process component on the canvas is considered as the preferred process component based on the distance between the dragged process component and the process components on the canvas 415. In this example, when the data merger is dragged towards the CSV reader, the compatibility between the data merger and the CSV reader is determined. If the data merger reader is dragged towards the JDBC reader, the compatibility between the data merger and the CSV reader is determined. On other hand, if the data merger is dragged at a position having equal distance to the two data source components (e.g., the CSV reader 435 and the JDBC reader 450), the compatibility of the data merger with the best compatible process component is determined.

In this example, the data merger is dragged at the position having equal distance with the two data source components (e.g., the CSV reader 435 and the JDBC reader 450). Since both the CSV reader and the JDBC reader are of same type and having same cardinality, the cardinality of the data merger is displayed by determining the compatibility of the data merger with the two data source components (e.g., the CSV reader 435 and the JDBC reader 450). The cardinality of the data merger can include two input ports as shown in 460A and multiple output ports as shown in 460B. Further, the data merger gets connected to the CSV reader 435 and the JDBC reader 450 upon dropping the data merger at the distance equal to the both the CSV reader 435 and the JDBC reader 450.

Figure 4D:
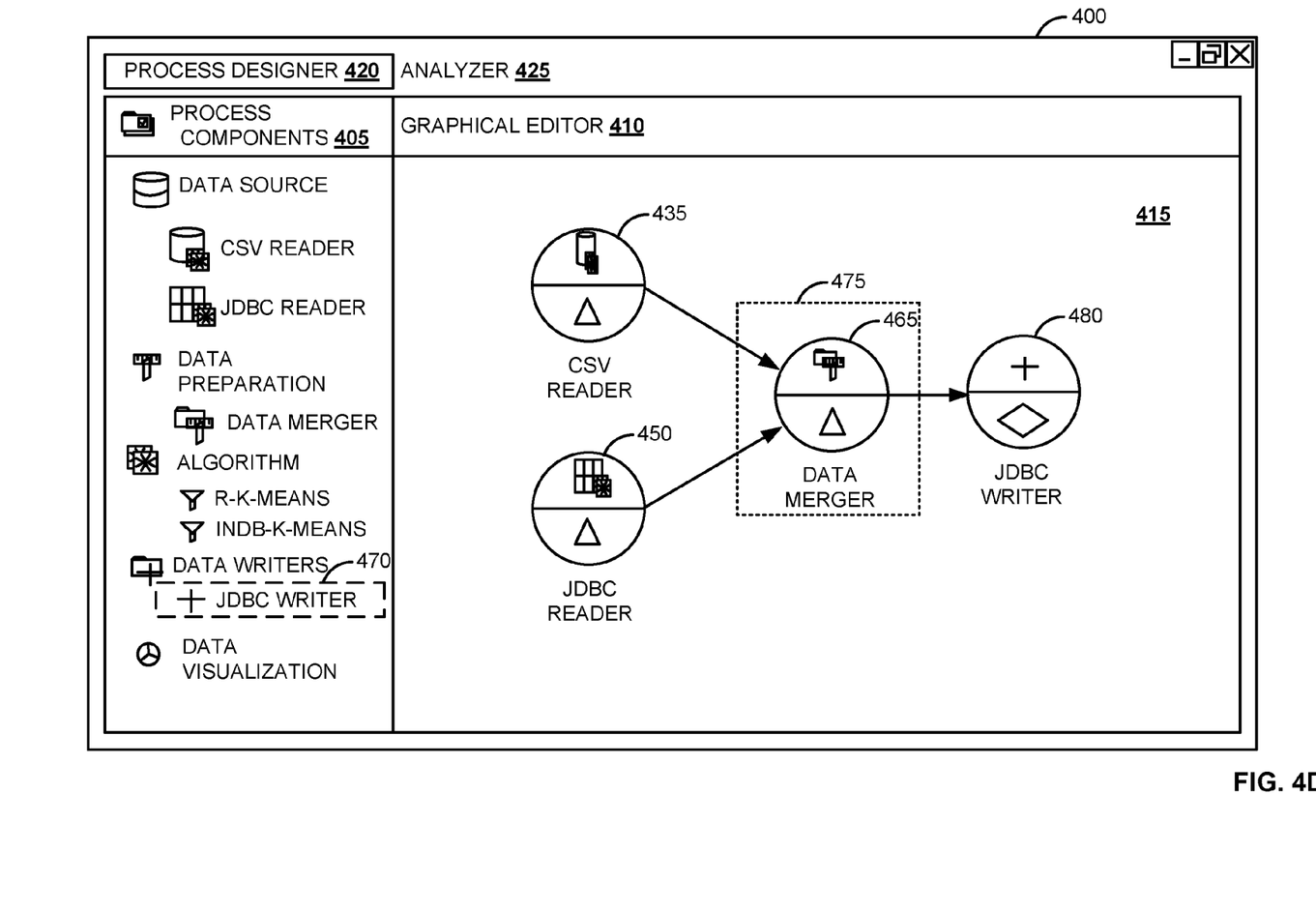

FIG. 4D shows the exemplary user interface 400 illustrating another step of the designing of the process flow of the business application, according to an embodiment. A selection of the data writer component (e.g., JDBC writer) is received. For example, the JDBC writer is selected via highlighting the JDBC writer as shown in 470. Further, a check is made to determine whether the canvas 415 includes process components. In this example, the canvas 415 includes the CSV reader 435, the JDBC reader 450 and the data merger 465 associated with the process flow.

At the next step, a preferred process component on the canvas 415 is identified. In this example, the data merger reader is selected as the preferred process component by a user as shown in 475. Therefore, the compatibility between the data merger and the JDBC writer is determined. In one embodiment, the compatibility is determined by the cardinality and the type of the process component. The JDBC writer is the data writer component having an input port and no output ports. The data merger 465 can have multiple output ports. Therefore, the input of the JDBC writer is connected to the output of the data merger 465 and hence the JDBC writer 480 is connected to the process flow. In one exemplary embodiment, if the user does not select the process components on the canvas as the preferred process component, a previous process component connected to the process flow is considered as the preferred process component. In this example, the data merger 465 is considered as the preferred process component.

Figure 4E:
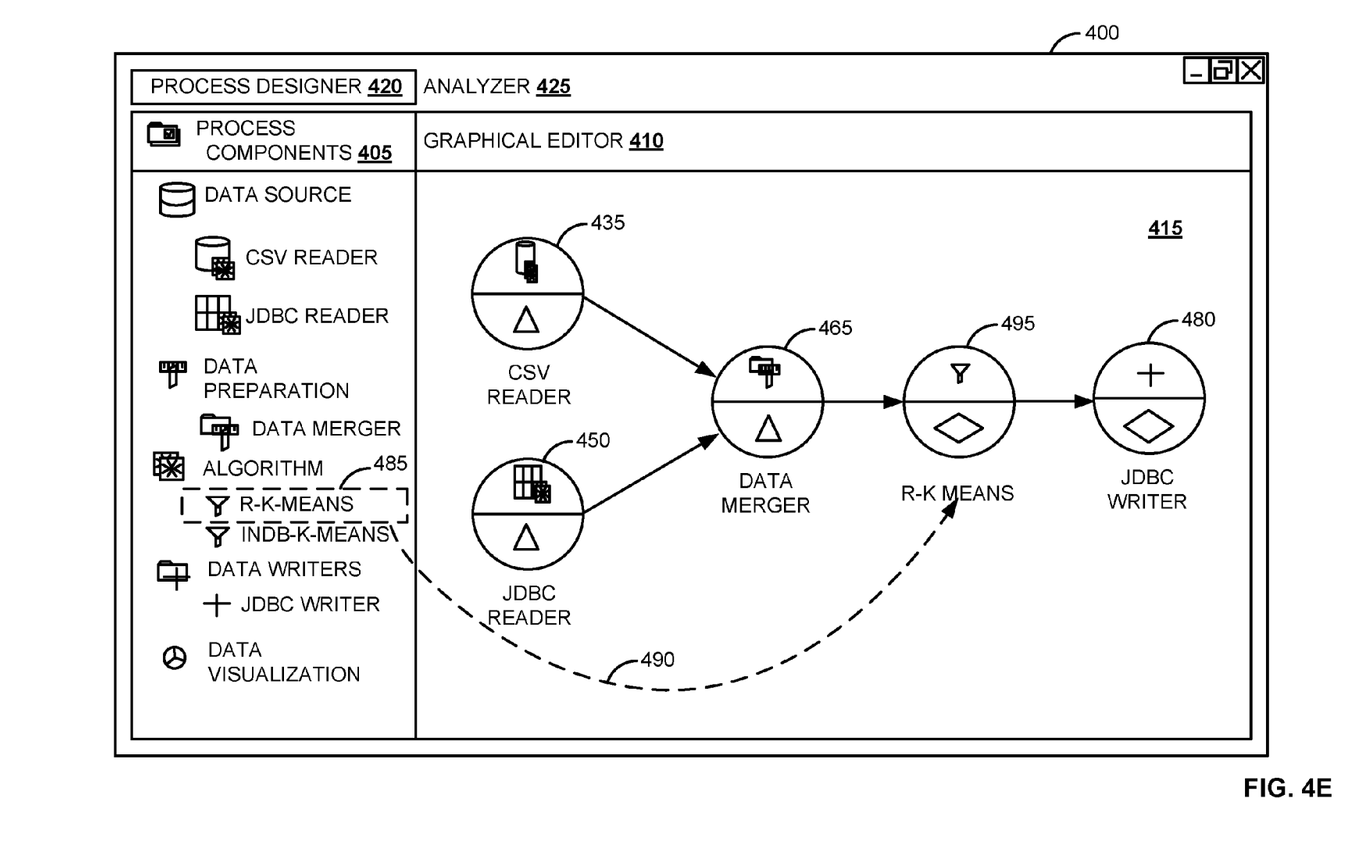

FIG. 4E shows the exemplary user interface 400 illustrating yet another step of the designing of the process flow of the business application, according to an embodiment. A selection of the algorithm component (e.g., R-K-Means) is received. For example, the R-K-Means is selected via dragging and dropping the R-K-Means as shown in 490. Further, a check is made to determine whether the canvas 415 includes process components. In this example, the canvas 415 includes the CSV reader 435, the JDBC reader 450, the data merger 465 and the JDBC writer 480 associated with the process flow.

At the next step, a preferred process component on the canvas 415 is identified. In one embodiment, the process component on the canvas is considered as the preferred process component based on the distance between the dragged process component and the process components on the canvas 415. In this example, the R-K-Means is dragged in-between the data merger 465 and the JDBC writer 480. Therefore, the compatibility of the R-K-Means with the data merger 465 and the JDBC writer 480 is determined. In one embodiment, the compatibility is determined by the type and the cardinality of the process component. R-K-Means can include an input port and can have multiple output ports. Further, the data merger can have multiple output ports and the JDBC writer can have an input port. Therefore, the R-K-Means gets connected to the process flow. In other words, the input of the R-K-Means 495 gets connected to the output of the data merger 465 and the output of the R-K-Means 495 gets connected to the input of the JDBC writer 480.

Figure 5:
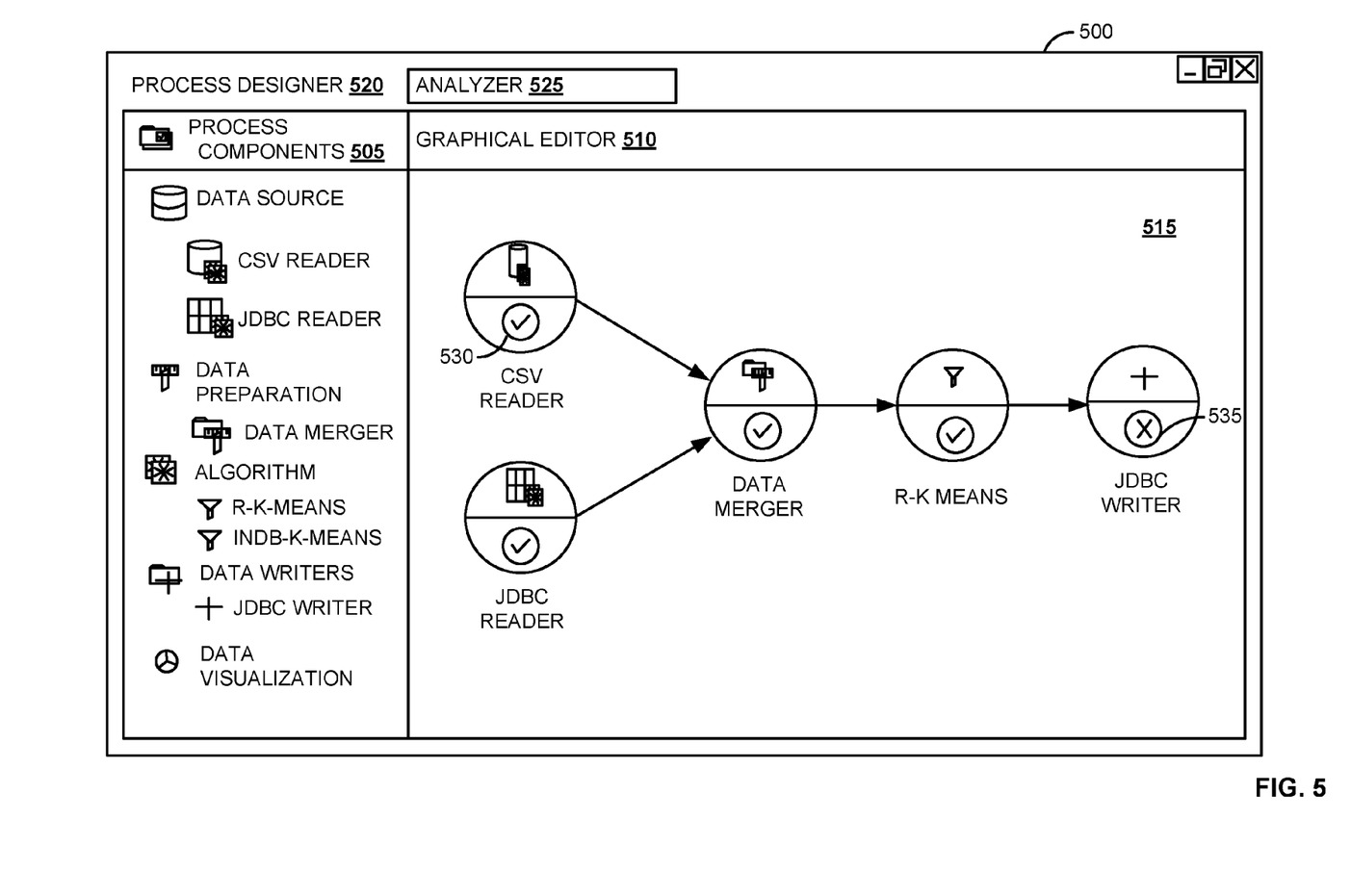
FIG. 5 is an exemplary user interface showing an analysis of the process flow of FIG. 4E, according to an embodiment.

FIG. 5 is an exemplary user interface 500 showing an analysis of the process flow of FIG. 4E, according to an embodiment. User interface 500 includes a process component panel 505 to display process components and a graphical editor 510 for designing the process flow. The process components 505 include data source components (e.g., CSV reader and JDBC reader), data preparation components (e.g., data merger), algorithm components (R-K-Means and INDB-K-Means), data writer components (e.g., JDBC writer), data visualization components, and the like. The graphical editor 510 includes a canvas 515 to display the design of a process flow associated with a business application as described in FIGS. 4A to 4E. In one exemplary embodiment, the user interface 500 may include a menu to select an option to design process flow (e.g., process designer 520) and an option to analyze the process flow (e.g., analyzer 525).

In operation, when the analyzer 525 is selected, the process flow on the canvas 515 is analyzed. In one exemplary embodiment, the execution status of the process components is displayed. For example, a tick 530 in the process component indicates that the process component is successfully executed. A cross 535 in the process component indicates that the process component is not successfully executed. Thereby, the execution status of the process flow can be easily tracked. The graphical representation of the process components on the graphical editor is described in greater detail in FIG. 6.

Figure 6:
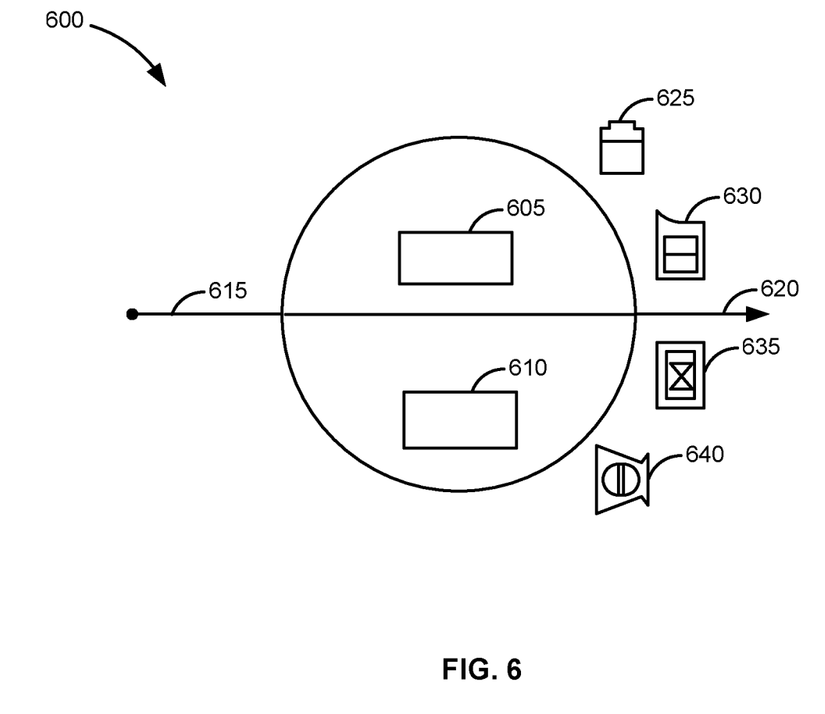
FIG. 6 shows a graphical representation of a process component on a graphical editor, according to an embodiment.

FIG. 6 shows a graphical representation of a process component 600 on a graphical editor, according to an embodiment. Upper portion 605 of the process component 600 may display the type of the process component. For example, by visualizing the upper portion 605 the type of the process component can be identified-whether the process component is a data source component, or a data preparation component, or a data writer component, or a data visualization component. Lower portion 610 of the process component 600 may display the status of the process component. The status of the process component can be identified by different shapes and colors. For example, grey icon having diamond shape may indicate that the process component is not configured. Orange icon having triangle shape may indicate that the process component is configured. Green icon having circle shape may indicate that the process component is successfully executed. Red icon having circle shape may indicate that there are errors in executing the process component.

In one embodiment, the cardinality of the process component is displayed. For example, the number of input ports is displayed by a connection line having oval end 615 and the number of output ports is displayed by a connection line having an arrow at the end 620. In one exemplary embodiment, the connection lines may be grayed out until a connection is established. Once the connection is established, the connection lines become darker. Further, the connection lines can rotate around 90 degrees up and 180 degrees down the axis depending on the location of the connected process component.

In one embodiment, upon right clicking the process component 600, a context menu is displayed. The context menu includes a shortcut to delete the process component 600 as shown in 625. A list of compatible process components associated with the process component 600 is displayed as shown in 630. In one exemplary embodiment, on selection of a process component from the list, the process component gets connected to the process flow. This is to enable creation of process flow without going to a process component panel. For example, the user needs to drag and drop, or double click the first process component of the process flow and then onwards, the user can use the right click to find out the compatible process components and construct the process flow on the graphical editor. Further, the context menu may include an option to execute the process flow as shown in 635 and an option to view the result of the process flow as shown in 640. In addition, the context menu can include shortcuts to context specific actions that the user can perform on the process component 600 to complete the design of the process flow.

In one exemplary embodiment, once a connection is made to a process component, a new connection arrow may appear at the middle of the process component to visually indicate that the user can pull the arrow for more connections. When highly compatible process components are placed closer, the connection arrows automatically turn towards the components to visually indicate that the component placed closer could be a best compatible process component. In case, if there are multiple compatible components which are in the same vicinity, the length of the arrow determines the highly compatible process components among the other process components. The highly compatible process component may have a longer arrow suggesting to the user that the process component is highly compatible. In case there are multiple compatible process components which are in the same vicinity, and user drags and drops a new process component which is equally compatible with both the existing components, multiple connection suggestions may be displayed to the user. The user may have to drag the new process component for the connection to be established.

In general, the method as described above inherits magnetic properties as compatible process components attract and non-compatible process components repel to design the process flow. It is advantageous that even though the method of determining compatibility is described with an example of designing the process flow on the graphical editor, the method can be implemented with other graphical visualization tools. Further, the above described method may provide infrastructural supports, like modeling canvas where the user can drag and drop the process components, property panel supports where the user can set values to various properties to the process components, linking support where the user can link the process components to create a process component chain, execution support where the user can execute the process component chain and visualization support where the user can visualize the results of the process component chain execution.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
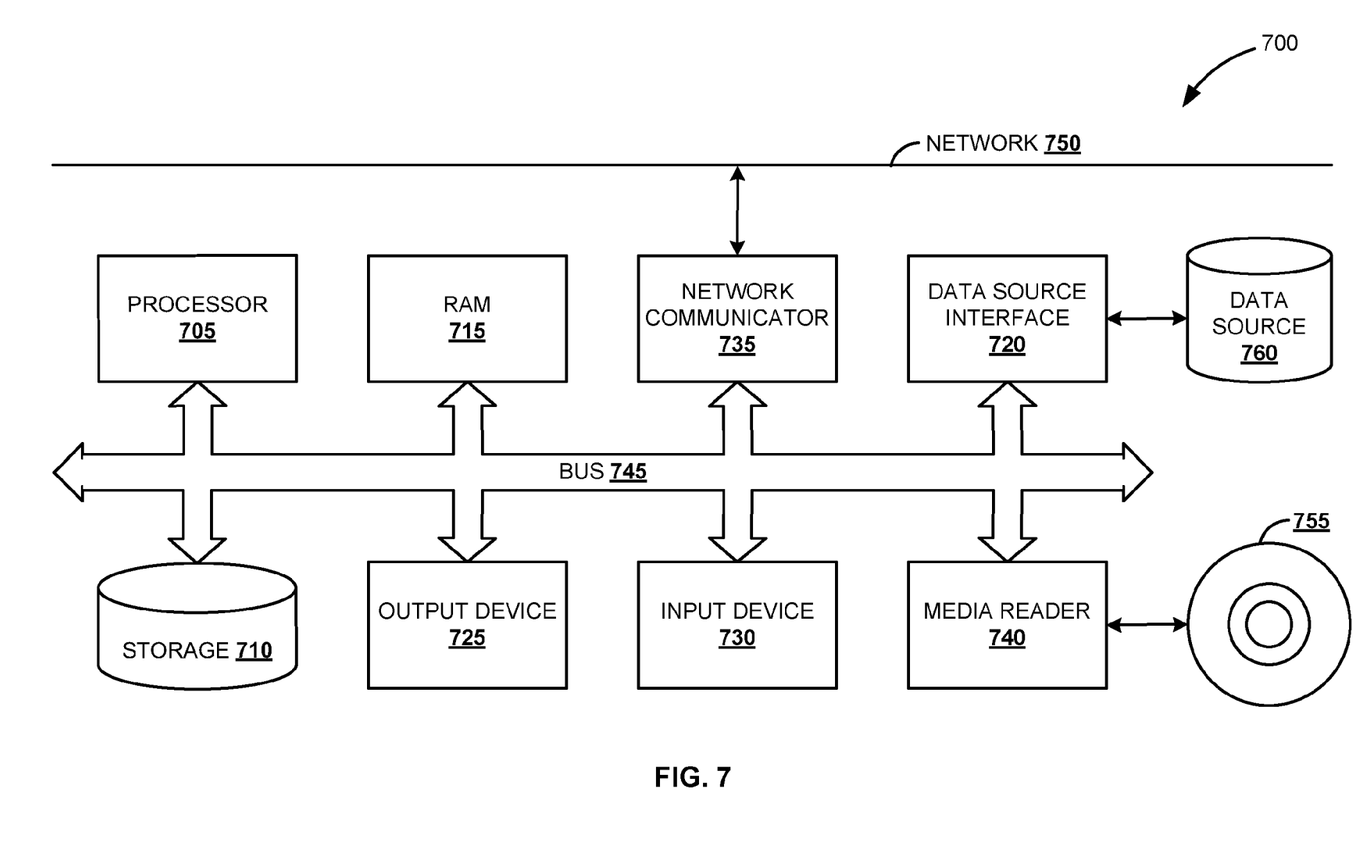
FIG. 7 is a block diagram illustrating a computing environment in which the techniques described to design a process flow based on connection compatibility between process components, according to an embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable storage medium to tangibly store instructions, which when executed by a computer, cause the computer to:
   receive a selection of a process component to connect to a process flow;
   determine that a graphical editor includes process components associated with the process flow;
   identify a preferred process component from the process components based on a type of selection of the selected process component, wherein the preferred process component is one of:
     a process component from the process components within a vicinity of the selected process component;
     a process component from the process components chosen as the preferred process component; and
     a previous process component connected to the process flow;
   determine a type of the selected process component and a type of the preferred process component;
   determine compatibility of the selected process component with the preferred process component in the graphical editor based on a cardinality of the selected process component, a cardinality of the preferred process component, the determined type of the selected process component and the determined type of the preferred process component;
   connect the selected process component to the preferred process component on the graphical editor based on the determined compatibility, wherein at least one of the process components and the selected process component comprises upper portions to graphically indicate types selected from a group consisting of data source components, pre-processing components, algorithm components, data preparation components, data writer components and data visualization components, and lower portions to graphically indicate statuses by different shapes and colors on the graphical editor.

2. The non-transitory computer readable storage medium of claim 1, further comprising: placing the selected process component on the graphical editor, if the graphical editor does not include the process components.

3. The non-transitory computer readable storage medium of claim 1, wherein selection of the process component comprises selecting the process component by dragging and dropping onto the graphical editor, the process components is considered as the preferred process component based on the distance between the selected process component and the process components on the graphical editor, and the cardinality of the selected process component is displayed on the graphical editor by determining compatibility of the selected process component with the preferred process component.

4. The non-transitory computer readable storage medium of claim 1, wherein the compatibility of the selected process component is determined with a previous process component connected to the process flow when the process components does not include the preferred process component.

5. The non-transitory computer readable storage medium of claim 1, wherein the cardinality of the selected process component comprises a number of input ports and a number of output ports of the selected process component and the cardinality of the preferred process component comprises a number of input ports and a number of output ports of the preferred process component.

6. The non-transitory computer readable storage medium of claim 1, wherein when the process component is dragged and dropped in-between two process components of the process components on the graphical editor, the compatibility of the process component with the two process components is determined and the process component is connected in-between the two process components based on the determined compatibility.

7. The non-transitory computer readable storage medium of claim 1, wherein the process component on the graphical editor comprises a context menu including at least one of a list of process components compatible to the process component, an option to delete the process component from the process flow, an option to execute the process flow and an option to view the process flow output.

8. A computer implemented method to design process flow based on connection compatibility between process components using a computer, the method comprising:
   receiving a selection of a process component, from a computer generated user interface, to connect to a process flow;
   determine that a graphical editor of the computer generated user interface includes process components associated with the process flow;

identify a preferred process component from the process components based on a type of selection of the selected process component, wherein the preferred process component is at least one of:
- a process component from the process components within a vicinity of the selected process component;
- a process component from the process components chosen as the preferred process component; and
- a previous process component connected to the process flow;

determine a type of the selected process component and a type of the preferred process component;

determine compatibility of the selected process component with the preferred process component in the graphical editor based on a cardinality of the selected process component, a cardinality of the preferred process component, the determined type of the selected process component and the determined type of the preferred process component;

connect the selected process component to the preferred process component on the graphical editor of the computer generated user interface based on the determined compatibility, wherein at least one of the process components and the selected process component comprises upper portions to graphically indicate types selected from a group consisting of data source components, pre-processing components, algorithm components, data preparation components, data writer components and data visualization components, and lower portions to graphically indicate statuses by different shapes and colors on the graphical editor.

9. The computer implemented method of claim 8, further comprising: placing the process component on the graphical editor, if the graphical editor does not include the process components.

10. The computer implemented method of claim 8, wherein when the process component is selected by dragging and dropping onto the graphical editor, the process components is considered as the preferred process component based on the distance between the selected process component and the process components on the graphical editor, and the cardinality of the selected process component displayed on the graphical editor by determining the compatibility of the selected process component with the preferred process component.

11. The computer implemented method of claim 8, wherein the compatibility of the selected process component is determined with a previous process component connected to the process flow when the process components does not include the preferred process component.

12. The computer implemented method of claim 8, wherein the cardinality of the selected process component comprises number of input ports and number of output ports of the selected process component and the cardinality of the preferred process component comprises number of input ports and number of output ports of the preferred process component.

13. The computer implemented method of claim 8, wherein selection of the process component comprises selecting the process component by dragging and dropping the process component in-between two process components of the process components on the graphical editor, the compatibility of the process component with the two process components is determined and the process component is connected in-between two process components based on the determined compatibility.

14. The computer implemented method of claim 8, wherein the process component on the graphical editor comprises a context menu including at least one of a list of process components compatible to the process component, an option to delete the process component from the process flow, an option to execute the process flow and an option to view the process flow output.

15. A computer system to design process flow based on connection compatibility between process components, the computer system comprising a processor, the processor communicating with one or more memory devices storing instructions to:

receive a selection of a process component to connect to a process flow;

determine that a graphical editor includes process components associated with the process flow;

identify a preferred process component from the process components based on a type of selection of the selected process component, wherein the preferred process component is at least one of:
- a process component from the process components within a vicinity of the selected process component;
- a process component from the process components chosen as the preferred process component; and
- a previous process component connected to the process flow;

determine a type of the selected process component and a type of the preferred process component;

determine compatibility of the selected process component with the preferred process component in the graphical editor based on a cardinality of the selected process component, a cardinality of the preferred process component, the determined type of the selected process component and the determined type of the preferred process component;

connect the selected process component to the preferred process component on the graphical editor based on the determined compatibility, wherein at least one of the process components and the selected process component comprises upper portions to graphically indicate types selected from a group consisting of data source components, pre-processing components, algorithm components, data preparation components, data writer components and data visualization components, and lower portions to graphically indicate statuses by different shapes and colors on the graphical editor.

16. The computer system of claim 15, further comprising instructions to place the process component on the graphical editor, if the graphical editor does not include the process components.

* * * * *